Patented Nov. 28, 1933

1,936,809

UNITED STATES PATENT OFFICE 1,936,809

PRODUCTION OF SULPHUR

Daniel Tyrer, Norton-on-Tees, England, assignor to Imperial Chemical Industries Limited, London, England, a British company No Drawing. Application June 19, 1931, Serial No. 545,491, and in Great Britain July 11, 1930

2 Claims. (Cl. 23—226)

This invention relates to the production of sulphur by reduction of sulphur dioxide with carbon at a high temperature, and more especially to processes in which coal, or similar carbonaceous material or incompletely carbonized products resulting therefrom are employed as the reducing agent. In my co-pending application Serial No. 543,349 filed June 10, 1931, I have described a process and apparatus for the reduction of sulphur dioxide by means of coal, according to one form of which a mixture of sulphur dioxide and air is supplied to the base of one of a pair of vertical retorts communicating at the top, the gases being passed upwardly through superposed layers of raw coal which becomes carbonized, and downwardly through the second retort wherein the upper layers of raw coal also become carbonized.

According to the present invention, a sulphur dioxide gas containing either no oxygen or an amount which is insufficient to maintain the necessary reaction temperature is passed through a bed of coal or the like at carbonizing temperature and the gaseous products are passed together with the balance of air required to maintain the reaction temperature through a bed of coke in which the reduction of the sulphur dioxide is completed and the tars, etc. are cracked. Thus the operation may be conducted in a comparatively deep bed of fuel while supplying the sulphurous gas at the top of the fuel bed and introducing the balance of air required to support the reaction at an intermediate depth, the gaseous products being withdrawn at a point at a lower depth than that at which the air is introduced. Thus coal or other suitable material of the kind indicated may be supplied to the top of a fuel bed the lower portions of which are maintained at a temperature of 1000°-1200° C. by the introduction of air through tuyères or the like. Hot sulphurous gas which is deficient in oxygen in the sense indicated is admitted at the top of the fuel bed and is caused to pass downwardly through the same, carbonizing the coal during its passage; the gaseous products, including those arising from the distillation of the fuel, then pass through a highly heated zone in the neighborhood of the air supply, the tars, etc. being cracked and the reduction of sulphur dioxide being completed. The resulting gas is withdrawn at a somewhat lower point, and the ash may be discharged at the bottom of the bed in the usual way. It will generally be convenient to preheat the initial sulphurous gas and if desired also the air supply, preferably with the aid of the heat of the gaseous products. The temperature of the inlet gases may be controlled in accordance with their oxygen content, but in any case they should be at such a temperature as to bring about carbonization of the coal, e. g. at least 400–500° C. If the gases leaving the fuel bed contain an excess of reducing gas, e. g. carbon monoxide, the latter may be utilized by adding further sulphur dioxide gas to the products and effecting a secondary reaction in known manner. The heat of the gaseous products may also be utilized by passing through an annular heating chamber surrounding the top of the fuel bed.

In general, the gaseous reaction products will contain besides the elemental sulphur obtained in the reaction, small amounts of hydrogen sulphide and carbon oxysulphide derived from the combination of the sulphur with the reducing gases present in the fuel bed. If desired, such hydrogen sulphide may be eliminated by mixing the gaseous products with the requisite amount of sulphur dioxide, either as such or mixed with inert gases, to effect the following reaction:

$$2H_2S + SO_2 = 3S + 2H_2O$$

a catalyst, such as bauxite, being employed if desired to further the reaction.

The final gas is treated for the recovery of sulphur in any suitable manner.

I claim:

1. In a process of obtaining elemental sulphur by reaction of sulphur dioxide with a carbonaceous fuel the steps of carbonizing a carbonaceous fuel by heating it in contact with a pre-heated sulphur dioxide gas containing insufficient amounts of oxygen to maintain said fuel at carbonizing temperature, starting said carbonization at a temperature of about 400 to 500° C., adding an oxygen containing gas to the so obtained reaction gases, passing said gas mixture through a bed of highly heated carbonaceous fuel maintained at a temperature above 1000° C. by the reactions between the fuel and said gas mixture, withdrawing the reaction gases and recovering therefrom the elemental sulphur formed.

2. In a process of obtaining elemental sulphur by reduction of sulphur dioxide with a carbonaceous fuel the steps of carbonizing coal by heating it in contact with pre-heated sulphur dioxide gas containing insufficient amounts of oxygen to maintain said fuel at carbonizing temperature, starting said carbonization at a temperature of about 400 to 500° C., adding pre-heated air to the so obtained reaction gas, passing said gas mixture through a bed of carbonaceous fuel as obtained by carbonizing coal in the first step of this process, maintaining said fuel at a temperature of about 1000° to 1200° C. by the reactions between said fuel and said gas mixture, withdrawing the reaction gases and recovering therefrom the elemental sulphur formed.

DANIEL TYRER.